US006961283B2

United States Patent
Kappius et al.

(10) Patent No.: US 6,961,283 B2
(45) Date of Patent: Nov. 1, 2005

(54) ADAPTIVE FILTERING APPARATUS AND METHOD FOR SEISMIC DATA ACQUISITION

(75) Inventors: Russell Kappius, Littleton, CO (US); Gary Crews, Plano, TX (US)

(73) Assignee: Input/Output, Inc., Stafford, TX (US)

( * ) Notice: Subject to any disclaimer, the term of this patent is extended or adjusted under 35 U.S.C. 154(b) by 194 days.

(21) Appl. No.: 10/391,960

(22) Filed: Mar. 19, 2003

(65) Prior Publication Data

US 2003/0198132 A1 Oct. 23, 2003

Related U.S. Application Data

(60) Provisional application No. 60/366,116, filed on Mar. 20, 2002.

(51) Int. Cl.[7] .................................................. G01V 1/36
(52) U.S. Cl. .............................. 367/43; 38/45; 181/112
(58) Field of Search ............................. 367/38, 43, 45; 181/112

(56) References Cited

U.S. PATENT DOCUMENTS

| 4,458,341 | A | * | 7/1984 | Goebel ........................ 367/43 |
| 4,723,231 | A | * | 2/1988 | Sallas ......................... 367/189 |
| 4,757,480 | A | * | 7/1988 | Gutowski ..................... 367/47 |
| 4,858,199 | A | * | 8/1989 | Griffith ........................ 367/45 |
| 4,890,264 | A | * | 12/1989 | Crews et al. ................. 367/45 |
| 5,448,531 | A | * | 9/1995 | Dragoset, Jr. ................ 367/45 |
| 5,511,008 | A | * | 4/1996 | Flament et al. ............. 702/190 |
| 5,555,530 | A | * | 9/1996 | Meehan ....................... 367/45 |
| 5,781,502 | A | * | 7/1998 | Becquey ...................... 367/31 |
| 5,971,095 | A | * | 10/1999 | Ozbek ......................... 181/112 |
| 6,266,620 | B1 | * | 7/2001 | Baeten et al. ................ 702/17 |
| 6,446,008 | B1 | * | 9/2002 | Ozbek .......................... 702/17 |
| 6,519,205 | B1 | * | 2/2003 | Baeten et al. ................ 367/45 |

OTHER PUBLICATIONS

Stewart, Robert R. "Ground–roll filtering using local instantaenous polarization." 1990.*

* cited by examiner

Primary Examiner—Bernarr E. Gregory
Assistant Examiner—Scott A. Hughes
(74) Attorney, Agent, or Firm—Madan, Mossman & Sriram, P.C.

(57) ABSTRACT

The present invention provides an adaptive filtering method for substantially eliminating ground roll noise encountered during seismic data acquisition. An apparatus for acquiring seismic data is provided that includes an adaptive filtering circuit coupled to a multi-axis sensor device.

22 Claims, 6 Drawing Sheets

ADAPTIVE FILTERING APPARATUS AND METHOD FOR SEISMIC DATA ACQUISITION

CROSS-REFERENCE TO RELATED APPLICATIONS

This application claims priority from U.S. Provisional Patent Application Ser. No. 60/366,116, filed Mar. 20, 2002.

BACKGROUND OF THE INVENTION

1. Field of the Invention

This invention relates generally geologic surveys and more particularly to an apparatus and method for acquiring and processing seismic data.

2. Description of the Related Art

Conventional geophone, accelerometer and hydrophone systems used in seismic prospecting typically have several sensors that produce signals indicative of acoustic energy usually in the form of a seismic wave. The seismic wave is usually produced by an energy source such as a vibrator truck, explosives or by an air gun in the case of a hydrophone system. These seismic signals are then conducted to acquisition/conversion circuitry. The analog signals from one or more remote seismic sensors (hydrophones, geophones, or other seismic sensors) are sampled and converted to a series of digital values by the acquisition/conversion circuitry. The acquisition/conversion circuitry is typically configurable to, for example, adjust the sampling rate, alter any digital filtering or other digital signal processing parameters, or perform diagnostics.

One or more of these acquisition/conversion circuits are connected to a data collection unit. Each data collection unit collects the series of digital values for all the seismic sensors connected to all the acquisition/conversion units connected to it. The data collection unit passes that data to a system controller, which may include a seismic recording device.

Acoustic seismic waves include a variety of energy signatures. They include P & Shear signals that are characterized by differing arrival times (differing velocities) at the detectors. The signals contain different frequencies for any given geologic event. Hence, they do not correlate between a time limited vertical and horizontal time window.

Other seismic signals are less desirable signals known as noise. One form of noise is known as ground roll. Ground roll noise, or simply ground roll arrives at vertical and horizontal components at the same time with the same frequencies. These signals are polarized at 90 degrees to each other. Therefore, the noise does correlate between time limited vertical and horizontal records.

Ground roll is generated when the acoustic source is activated. The acoustic energy reflects from shallow impedances as well as impedances at a target depth. The shallow reflections have large amplitude as compared to reflections from the target depth, and sometimes arrive at surface detectors at the same time. Noise issues adversely affect seismic data acquisition to the extent that many conventional systems are designed around noise characteristics rather than seismic signal needs. One example is the generally accepted practice of deploying geophones in arrays in an effort to cancel the effects of ground roll based on the fact that these noise signals have different frequencies than signal events (band limited at least), are large amplitude and are dispersive. Using arrays alone to reduce ground roll is only partially successful at ground roll elimination. Additionally, the slow velocity of ground roll requires strict spatial sampling requirements if it is to be eliminated using traditional filtering approaches such as frequency-wave number (FK) filtering.

Polarization filters are the broad category of filters that rely on detection and separation of ground roll due to its elliptical particle motion. Several polarization filters have been used with only limited success because of the dispersing nature of ground roll as well as the invalidation of many assumptions due to local geologic conditions.

Adaptive systems are generally characterized by the ability to adjust performance in a time-varying fashion using a dynamic noise estimate input. Known adaptive filtering techniques do not include the ability to use both the vertical and horizontal components from a single multi-axis sensor. Moreover, the typical filtering methods do not differentiate ground roll from other forms of energy and may filter desirable signals as well as ground roll. Finally, the typical system does not provide the ability to reduce ground roll station-by-station, because of the general reliance on spatial sampling and receiver arrays.

SUMMARY OF THE INVENTION

The present invention addresses the above-identified problems found in the conventional seismic data acquisition system by providing a system having a plurality of field units including one or more seismic sources, one or more multi-axis seismic sensors for receiving acoustic energy generated by the sources and reflected within an underground formation, a data acquisition unit, a receiver/transmitter, and a central controller processor remotely located from one or more field units. An adaptive filter algorithm used by the processor to process vertical and horizontal sensor outputs based on initial filter coefficients, wherein the filter coefficients are adapted on a sample-by-sample basis as an estimate of the noise changes. In a preferred embodiment, the initial filter coefficients are stored in a memory device in the controller.

A method according to the present invention includes two steps. The first is filter design where offset dependent application windows based on instantaneous phase differences between vertical and horizontal components are defined. A frequency band may be selected using a band pass filter if desired. The second step is to apply a least-mean-square (LMS) adaptive filter algorithm to only the data within the offset window and time tapering in and out of the window.

In one aspect, the present invention is used to reduce or eliminate geophone arrays to attenuate ground roll. The system of the present invention is not dependent on azimuth design parameters associated with many receiver array designs. The present invention provides the ability to design a system using desired signals as a primary design factor instead of noise signals.

The present invention provides an effective ground roll filter without concern for arrays, spatial sampling, while reducing dependence on noise polarization. In one aspect an apparatus for providing filtered seismic signals, comprises a detector coupled to the earth for receiving an acoustic wave, the detector providing an output comprising a first signal and a second signal, the first signal and the second signal being indicative of directional components of the received acoustic wave. A processor is coupled to the detector for receiving the first signal and the second signal, said processor processing commands for applying an adaptive filter algorithm to the first signal, the adaptive filter including a feedback signal indicative of a selected portion of the first signal combined with the second signal.

The detector is preferably a MEMS multi-axis accelerometer, and an optional band pass filter can be used to filter the adaptive filter output. Alternatively, the band pass filter can be any other useful band filter, e.g., a band stop filter.

BRIEF DESCRIPTION OF THE DRAWINGS

The novel features of this invention, as well as the invention itself, will be best understood from the attached drawings, taken along with the following description, in which similar reference characters refer to similar parts, and in which.

DETAILED DESCRIPTION OF THE INVENTION

Figure 1:
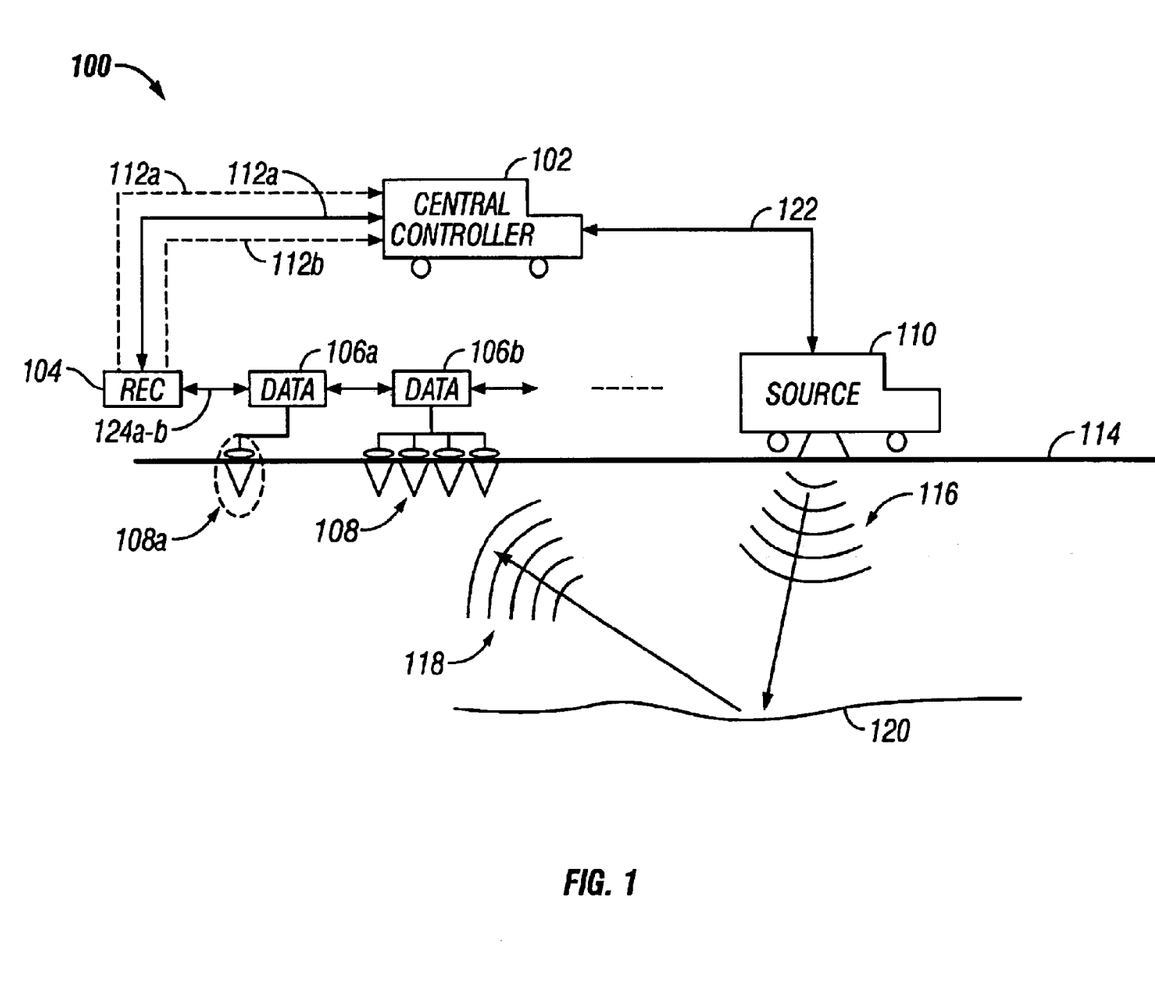
FIG. 1 is a system schematic of one embodiment of a seismic data acquisition system according to the present invention.

FIG. 1 is a system schematic of one embodiment of a seismic surveying system according to the present invention. The system 100 includes a primary control and recording unit 102 for delivering commands to and receiving data signals from one or more remote units in the system 100. As shown, the primary control and recording unit 102 is a mobile unit known by those skilled in the art as a "truck" or "dog house". Alternatively, the primary control and recording unit may be housed in any vehicle or carrier, or may be semi-permanently installed at a predetermined location.

The primary control and recording unit 102 (also referred to hereinafter as the central controller 102) is coupled to one or more receiver units 104. The receiver units may be co-located with the central controller 102 or the units 104 may be located in the field, e.g., in the spread. The receivers 104 are linked via a two-way communication link 124 to a plurality of data acquisition units ("DAUs") 106a–106b, etc. . . . . The data acquisition units 106 include circuitry for receiving signals from an array 108 of seismic sensors 108a. Each seismic sensor preferably provides a digital output signal indicative of sensed seismic activity. In an alternative embodiment, the sensor output signal is analog, with A/D conversion being performed within a DAU.

The system 100 further includes a seismic source 110 such as crew of one or more vibrator trucks, explosives (e.g. dynamite), air guns, or the like. The source 110 and central controller 102 are linked via a two-way communication link 122. The communication link 122 may be analog or digital, and data so communicated preferably includes control settings, shot commands, location (relative and/or global) status information, source availability, source grade, and any other information useful in managing the survey.

In operation, the source 110 imparts acoustic energy into the surface 114 of the earth, thereby setting up an acoustic wave 116 radiating generally downward into the earth. The acoustic wave 116 will partially reflect at an impedance change such as a formation boundary 120, thus producing a reflected wave 118 that travels generally back toward the surface 114.

The reflected wave 118 is detected at the detector array 108 by the individual sensors 108a. The sensors may be any number of sensors adapted to detect acoustic energy, such as a geophone, a microphone, an accelerometer-based detector, a hydrophone in the case of wetlands, and the like. Alternatively, the array may be a single element or include many elements. The detectors 108a may provide an analog or digital output signal, and there may be a combination of detectors in an array 108, e.g., a combination of detector types and/or output signals just described.

In a preferred embodiment, the detectors 108a are multi-axis detectors using micro electromechanical systems (MEMS) accelerometers. These MEMS detectors are discussed in detail in U.S. application Ser. No. 09/936,634 filed on Sep. 12, 2001, and which is based on PCT application PCT/US00/07310 filed on Mar. 17, 2000. Each application is hereby incorporated herein by reference in its entirety.

The output signals from an array 108 may comprise signals from the individual detectors 108a or may comprise one signal per detector. In one embodiment, the signal(s) are preprocessed using a processor (not separately shown) within each data acquisition unit 106a–106b. The data are then transmitted to the receiver 104. The receiver 104 is shown as a single receiver for simplicity. Those skilled in the art would readily understand that any number of receivers might be deployed in practice to receive data from sensor arrays 108. The signals may be processed according to the present embodiment or the signals may be processed at any suitable location in the system 100, such as within the receiver 104 or central controller 102 using an adaptive filter according to the present invention.

In one embodiment, couplings 112 between the central controller 102 and the receiver 104, couplings 124 between the receiver 104 and DAUs 106, and between each DAU and sensor array 108, and couplings 122 between the central controller 102 and the source 110, are electrically conductive wires 112a and 112b, 122a, 122b, 124a, 124b. These couplings are referred to collectively as couplings 112/124, and when otherwise required, an individual coupling will be discussed using a respective reference numeral. The wires comprising the couplings 112/124 are selected to adequately transfer electrical power and data as required by a particular application. Alternatively, the couplings 112/124 may be any suitable coupling capable of transferring electrical power and data signals. It is not necessary that one coupling, for example coupling 112a, be the same coupling type as any other the other coupling, say 112b, along the complete signal path. Exemplary couplings may be any combination of wire, radio frequency, optical fiber, or electromagnetic. Alternatively and where power is otherwise provided to any particular unit, e.g., a battery in the receiver or a generator as with the source 110, the couplings 112/124 may also include a radio link. In these alternative embodiments, transceivers (combination receiver and transmitter) are installed in the units so linked. Couplings 112/124 between the central controller 102 and the receiver 104 are shown as dashed lines to illustrate this point.

Figure 2:
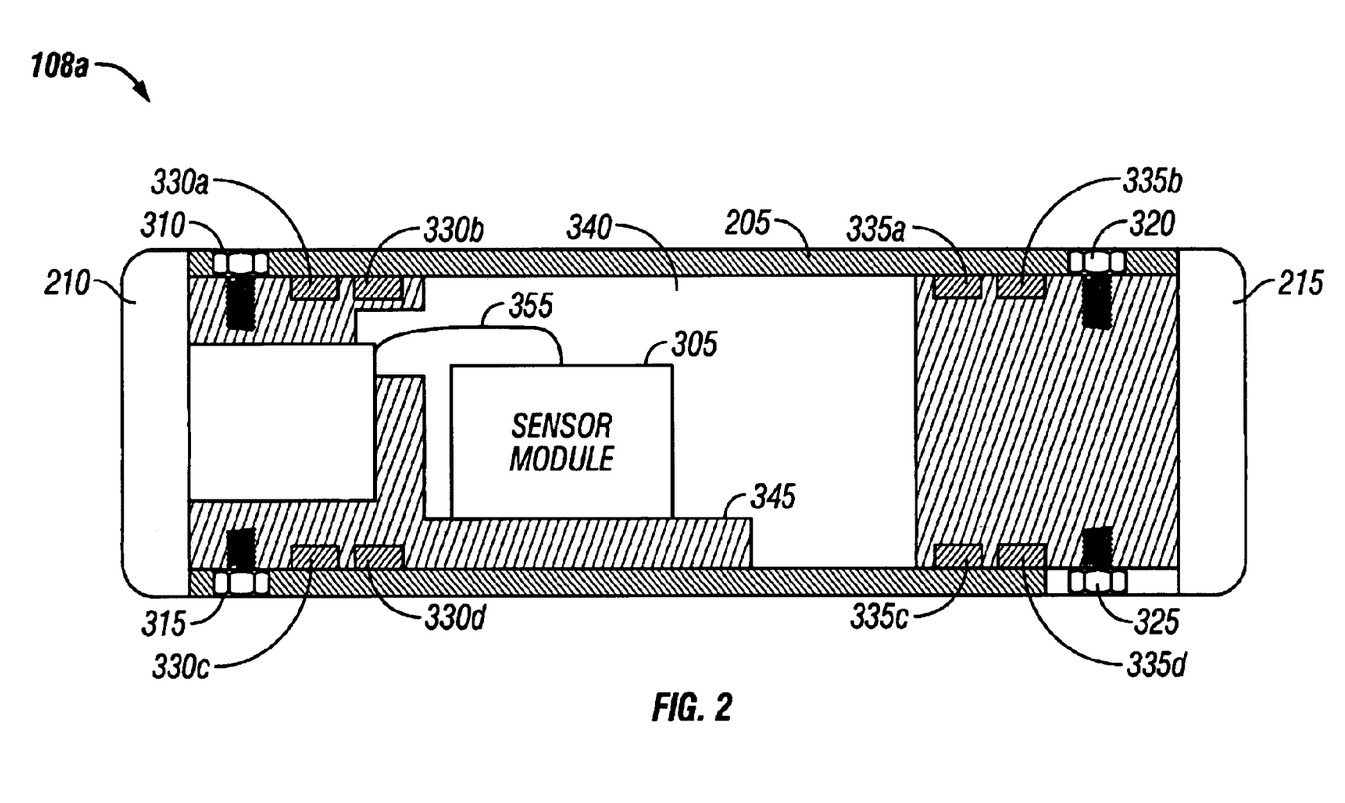
FIG. 2 is a multi-axis sensor for use in a system as in the system of FIG. 1.

Referring to FIG. 2, an embodiment of the sensor apparatus 108a includes a housing 205 coupled to a first end cap 210, a second end cap 215 and a sensor module 305. The housing 205 is coupled to the end caps 210 and 215 by coupling members such as mechanical fasteners 310, 315, 320 and 325.

Sealing members 330a–d seal the interface between the housing 205 and the first end cap 210, and sealing members 335a–d seal the interface between the housing 205 and the second end cap 215. The sealing members 330a–d and 335a–d may be elastomer rings capable of being compressed to a predetermined position for sealing.

The housing 205 preferably includes a cavity 340 and a planar surface 345. In one embodiment, the housing 205 is a metal tube fabricated from high strength materials in order to provide a robust pressure vessel.

The sensor module 305 is supported by the planar surface 345 within the cavity 340 of the housing 205 and is coupled to the first end cap 210 by a PC-board connection 355.

Figure 3:
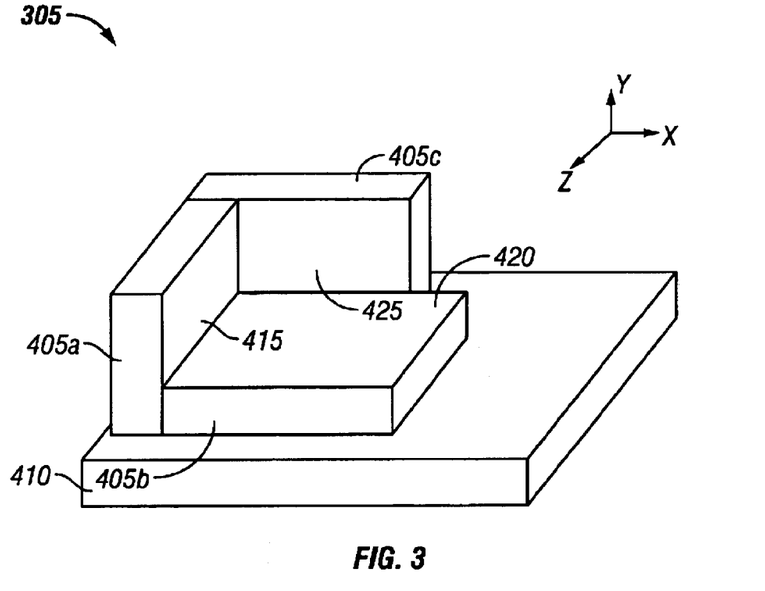
FIG. 3 is an embodiment of the sensor module of FIG. 2.

Referring to FIG. 3, the sensor module 305 preferably includes sensor packages 405a–c and a substrate 410. Each sensor package 405a–c includes a corresponding axis of sensitivity 415, 420 and 425. Each axis of sensitivity 415, 420 and 425 is approximately parallel to the x-axis, y-axis and z-axis, respectively.

Figure 4:
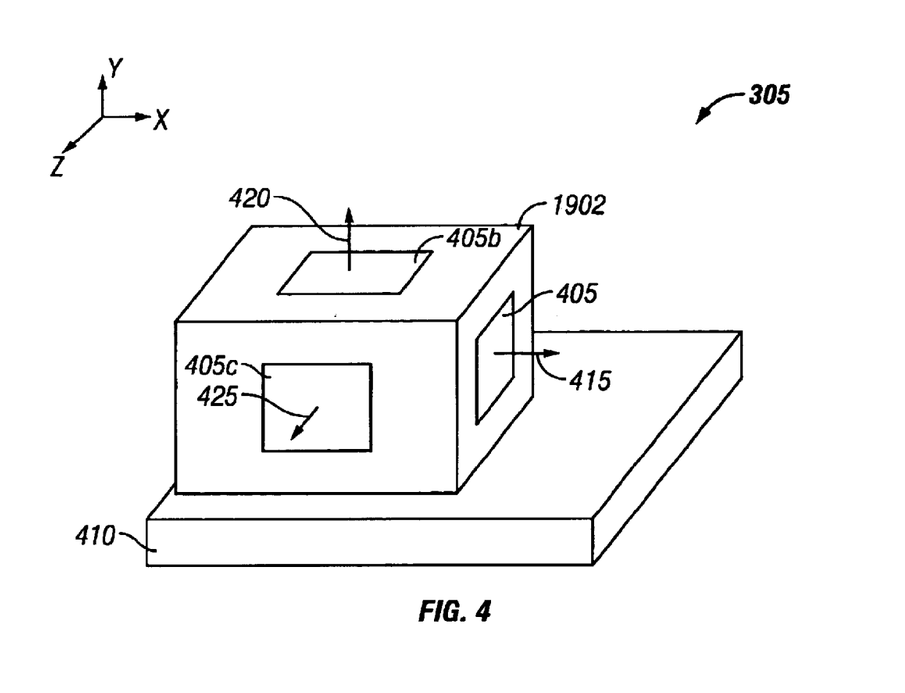
FIG. 4 is an alternative embodiment of the sensor module of FIG. 3.

Referring to FIG. 4, an alternate embodiment of the sensor module 305 includes the sensor packages 405, a substrate 410, and a monolithic package 1902. The sensor packages 405 are coupled to the monolithic package 1902. In one embodiment, the sensor module 305 includes a first sensor package 405a, a second sensor package 405b, and a third sensor package 405c. The first sensor package 405a includes an axis of sensitivity 415. The axis of sensitivity 415 is approximately parallel to the x-axis. The first sensor package 405a is coupled to the monolithic package 1902 to maintain the axis of sensitivity 415 parallel to the x-axis. The second sensor package 405b includes an axis of sensitivity 420. The axis of sensitivity 420 is approximately parallel to the y-axis. The second sensor package 405b is coupled to the monolithic package 1902 to maintain the axis of sensitivity 420 parallel to the y-axis. The third sensor package 405c includes an axis of sensitivity 425. The axis of sensitivity 425 is approximately parallel to the z-axis. The third sensor package 405c is coupled to the monolithic package 1902 to maintain the axis of sensitivity 425 parallel to the z-axis.

Figure 5A:
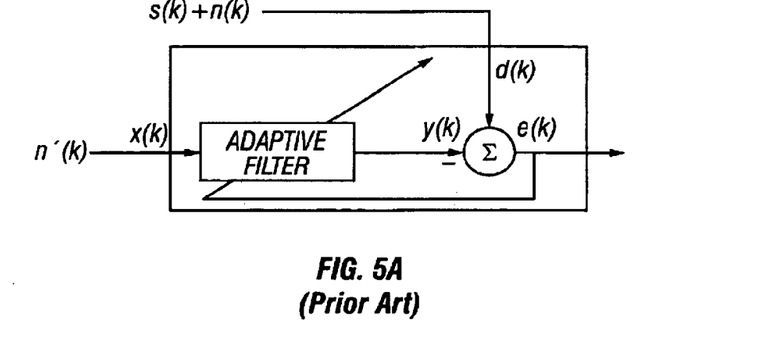
FIG. 5A illustrates a conventional adaptive filter.

The apparatus of the present invention provides an adaptive filter for removing undesirable signals such as ground roll prior to signal processing. FIG. 5A represents a conventional adaptive filter. Similar adaptive filters have been used to remove non-uniformly distributed noise, such as machinery noise, from seismic signals. An example of this filter application is described in U.S. Pat. No. 4,890,264 to Crews et al. Another application of the conventional filter is to remove ground roll noise. An example of this ground roll filter application is found in U.S. Pat. No. 4,556,962 to Widrow. The Widrow device utilizes a filter input signal n'(k) derived from either a separate geophone used to detect ground roll, or a signal directly from an acoustic source. The term n'(k) represents a noise input and x(k) is a generic representation of an input to the adaptive filter having an output signal designated as y(k). A second system input is a desired signal d(k), and the desired signal is a combination of noise n(k) and acoustic signal s(k) detected by a known acoustic sensor. The input d(k) and adaptive filter inverted output y(k) are then summed to produce an output e(k) indicative of signal error. The error signal e(k) is then fed back into the adaptive filter for updating the filter output y(k) for successive data processing. In this typical system, ground roll is cancelled by summing the noise input with an average of signals from an array of geophones. In every case described, the geophone is a unidirectional detector.

Figure 5B:
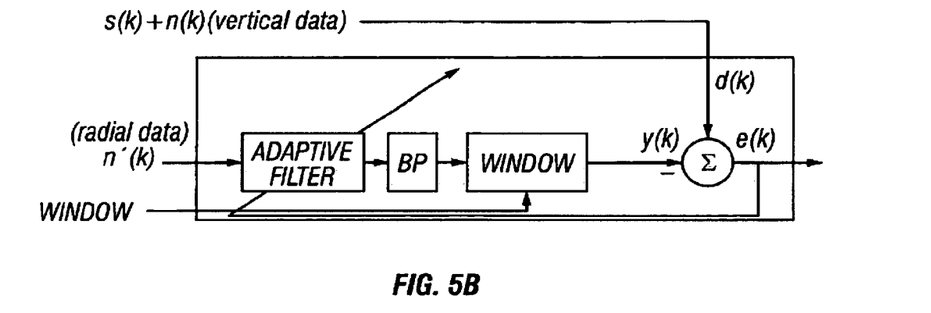
FIG. 5B is an adaptive filter according to the present invention.

FIG. 5B is an adaptive filter 500 according to the present invention. The adaptive filter includes multi-axis sensor input signals that provide vertical and horizontal (or radial) components to the filter. Ground roll exhibits an elliptical retrograde particle motion, which results in energy arriving in both vertical and horizontal components of a three-component seismic detector as those described above and shown in FIGS. 2–4. Furthermore, the polarized nature of the ground roll allows differentiation between the ground roll and other signals and/or noise that may also correlate between horizontal and vertical components.

The problematic nature of ground roll arises from its slow velocity combined with large amounts of dispersion. These factors combine to make removal of ground roll in processing troublesome. Adaptive filtering according to the present invention provides single receiver station filters using correlation between components to identify and remove noise with non-stationary filters.

When ground roll is of sufficient amplitude to be a concern in seismic data, it is clearly visible within a shot record as a high-amplitude, low-frequency, dispersed noise train. However, there are also other wave types, such as pure shear refracted arrivals and Love waves that can arrive at nearly the same time and which are mischaracterized as ground roll. The filter design of the present invention isolates the ground roll in time as well as frequency prior to filtering so that only the seismic data clearly contaminated with ground roll is filtered.

FIG. 5B shows detected vertical data as signal plus noise s(k)+n(k) as system input d(k). A radial wave is detected and input as noise signal n'(k) to the system adaptive filter. In the present invention, the filter output is further refined by creating a "window" using time parameters for isolating particular radial data. An optional bandpass (BP) filter might be used to narrow the data band. Thus the inverted output y(k) is more precise before summing with d(k). This results in a better system error output e(k), which is then fed back to the adaptive filter.

Differentiation of ground roll is done by displaying difference plots between instantaneous phase of vertical and horizontal data from a single three-component sensor. The resulting difference section provides the ability to easily identify the polarized noise.

The system 100 described above and shown in FIGS. 1–5B may be used in preferred methods of the present invention. The acoustic source is used to apply an acoustic energy signal to the earth. The acoustic energy will also generate ground roll noise signals that will reach the multi-axis sensors as substantially the same time as acoustic signals reflected from a desired or target depth. The multi-axis detector transforms the received acoustic signals into vertical and horizontal output signals. The vertical and horizontal signals from a multi-axis detector 108a are transmitted to a processor housed, for example, in a data acquisition unit. The data acquisition unit includes memory-stored instructions for conducting a filtering algorithm that is applied to the vertical and horizontal output signals. The filtering algorithm is an adaptive filter by which input noise coefficients are adapted based on changing input conditions. The initial filter coefficients can be stored in a memory device for use by the processor applying the adaptive filter. The memory device and processor need not be co-located. In one embodiment the processor and memory device are located at the central controller. Alternatively, the coefficients can be located in a memory device in a DAU or in any other desired location. Likewise, the processor need not be on the central controller. The processor can be located at any desired location, e.g., in a DAU. The methods are further described in conjunction with FIGS. 6 and 7.

Figure 6:
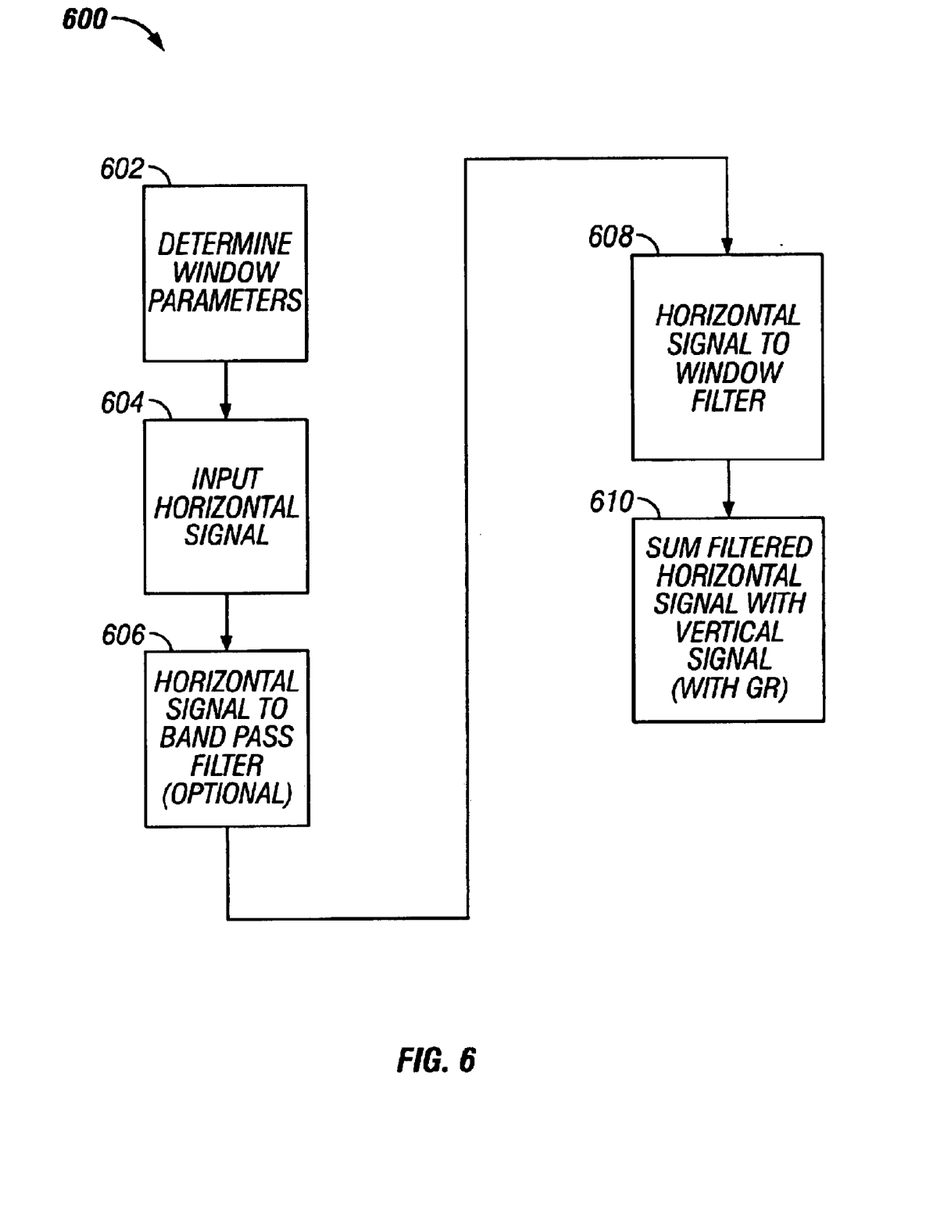
FIG. 6 is a flow diagram of a method according to the present invention.

Referring now to FIG. 6, shown is a flow of a preferred method 600 of applying an adaptive filter to attenuate ground roll from selected signals according to the present invention. In a preferred embodiment, the instructions of the present method are contained in memory housed in the system described above and shown in FIG. 1. These instructions are carried out by a processor within the system to remove ground roll from a vertical signal that includes desired seismic reflected waves as well as ground roll noise.

As described above, window parameters are determined 602 using signals received from the vertical and horizontal outputs of a multi-axis seismic sensor. The parameters are indicative of those signals having distinctive ground roll characteristics. For example, when the vertical and horizontal signal phase difference is approximately 90 degrees.

The sensor horizontal output signal is transmitted to the adaptive filter 604, and an optional band pass filter is applied 606 to select a particular band. The horizontal signal is then compared 608 to the window parameters, and those frequencies that meet window parameter criteria are summed 610 with vertical sensor signals that include ground roll noise. The resulting output is iteratively transmitted back to the adaptive filter for further filtering such that a final output vertical signal is substantially free of ground roll noise.

Figure 7:
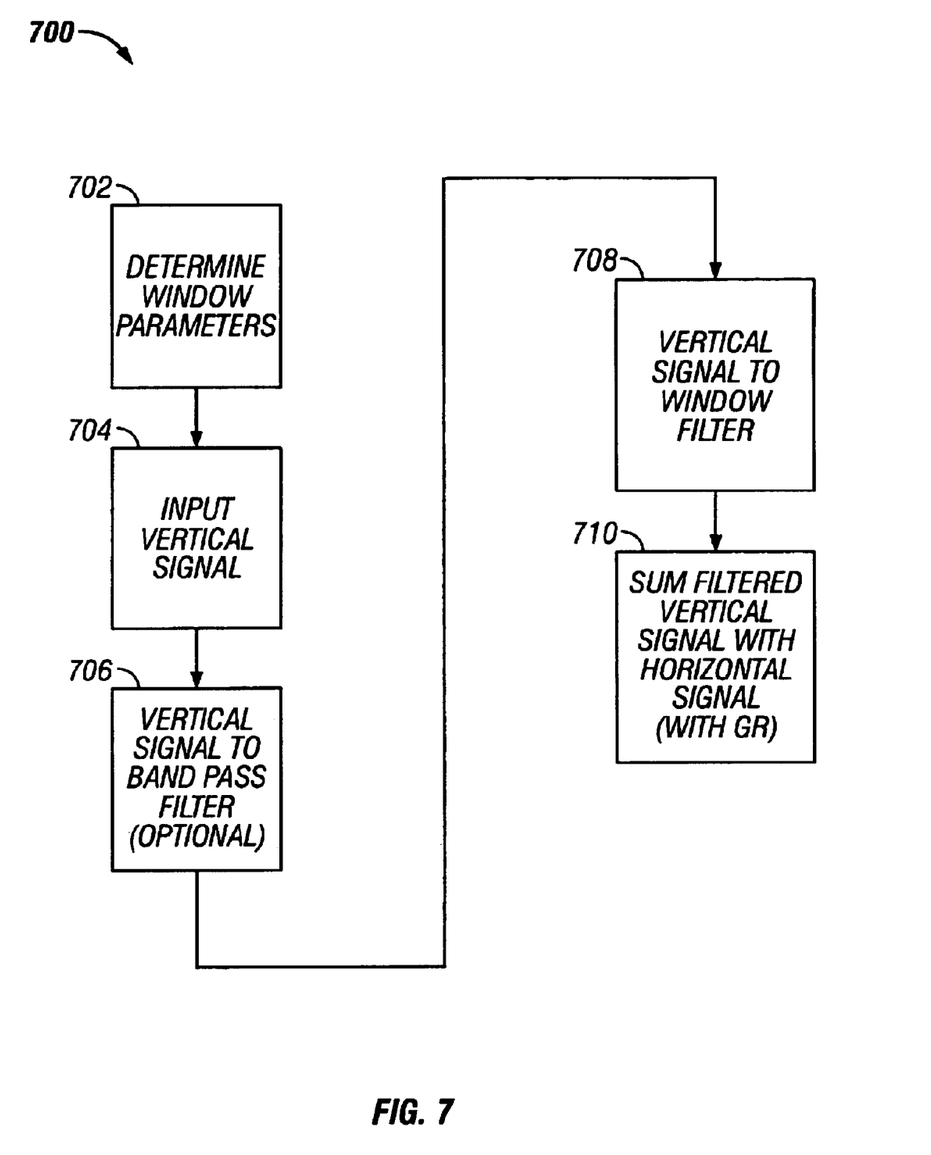
FIG. 7 is a flow diagram of an alternative method according to the present invention.

Referring now to FIG. 7, an alternative adaptive filtering method 700 according to the present invention is shown. This method is substantially similar to the method of FIG. 6, except that the vertical and horizontal sensor output signals are reversed. This method provides a filtered horizontal signal when such is desired. Window parameters are determined 702 using signals received from the vertical and horizontal outputs of a multi-axis seismic sensor. The parameters are indicative of those signals having distinctive ground roll characteristics. For example, when the vertical and horizontal signal phase difference is approximately 90 degrees.

The sensor vertical output signal is transmitted to the adaptive filter 704, and an optional band pass filter is applied 706 to select a particular band. The vertical signal is then compared 708 to the window parameters, and those frequencies that meet window parameter criteria are summed 710 with horizontal sensor signals that include ground roll noise. The resulting output is iteratively transmitted back to the adaptive filter for further filtering such that a final output horizontal signal is substantially free of ground roll noise.

The foregoing description is directed to particular embodiments of the present invention for the purpose of illustration and explanation. It will be apparent, however, to one skilled in the art that many modifications and changes to the embodiment set forth above are possible without departing from the scope of the invention. It is intended that the following claims be interpreted to embrace all such modifications and changes.

What is claimed is:

1. A method of filtering seismic signals in a seismic survey system, the method comprising:
   a) receiving an acoustic wave using a detector;
   b) transmitting from the detector a first signal and a second signal, the first signal and the second signal being indicative of directional components of the received acoustic wave;
   c) applying an adaptive filter algorithm to the first signal, the adaptive filter including a feedback signal indicative of a selected portion of the first signal combined with the second signal; and
   d) determining the selected portion of the first signal at least in part by applying a set of predetermined window parameters to an output of the adaptive filter algorithm, wherein the predetermined window parameters include phase and timing parameters.

2. The method of claim 1 further comprising determining the selected portion of the first signal at least in part by applying a band filter to an output of the adaptive filter algorithm.

3. The method of claim 2, wherein the band filter is a band pass filter.

4. The method of claim 1, wherein the first signal and the second signal comprise signals having a phase difference of approximately 90 degrees.

5. The method of claim 1, wherein the first signal is a horizontal signal and the second signal is a vertical signal.

6. The method of claim 1, wherein the algorithm is applied to remove ground roll from the seismic signal.

7. The method of claim 1, wherein applying the adaptive filter further comprises applying the adaptive filter based at least in part on initial filter coefficients.

8. The method of claim 7 further comprising updating initial filter coefficients when applying the adaptive filter to successive received acoustic waves.

9. The method claim 1, wherein the detector comprises a multi-axis detector.

10. The method of claim 9 further comprising using a MEMS multi-axis detector for receiving the acoustic wave.

11. A method of filtering seismic signals in a seismic survey system, the method comprising:
   a) receiving an acoustic wave using a detector;
   b) transmitting from the detector a first signal and a second signal, the first signal and the second signal being indicative of directional components of the received acoustic wave;
   c) applying an adaptive filter algorithm to the first signal, the adaptive filter including a feedback signal indicative of a selected portion of the first signal combined with the second signal; and
   d) determining the selected portion of the first signal at least in part by applying a set of predetermined window parameters to an output of the adaptive filter algorithm, wherein determining window parameters includes selecting offset dependent application windows based at least in part on phase differences between vertical and horizontal components of the acoustic wave.

12. An apparatus for providing filtered seismic signals, comprising:
   a) a detector coupled to the earth for receiving an acoustic wave, the detector providing an output comprising a first signal and a second signal, the first signal and the second signal being indicative of directional components of the received acoustic wave;
   b) a processor coupled to the detector for receiving the first signal and the second signal, said processor processing commands for applying an adaptive filter algorithm to the first signal, the adaptive filter including a feedback signal indicative of a selected portion of the first signal combined with the second signal, wherein the selected portion of the first signal is determined at least in part by applying a set of predetermined window parameters to an output of the adaptive filter algorithm, wherein the predetermined window parameters include phase and timing parameters.

13. The apparatus of claim 12, wherein the detector comprises a multi-axis detector.

14. The apparatus of claim 13, wherein the multi-axis detector includes a multi-axis MEMS accelerometer.

15. The apparatus of claim 12 further comprising a band filter to filter an output of the adaptive filter.

16. The apparatus of claim 15, wherein the band filter includes a band pass filter.

17. The apparatus of claim 12, wherein the first signal and the second signal comprise signals having a phase difference of approximately 90 degrees.

18. The apparatus of claim 12, wherein the first signal is a horizontal signal and the second signal is a vertical signal.

19. The apparatus of claim 12 further comprising an apparatus output signal, wherein the algorithm is applied to remove ground roll from the seismic signal.

20. The apparatus of claim 12 further comprising a memory device having stored therein initial filter coefficients used at least in part in the application of the adaptive filter.

21. The apparatus of claim 20, wherein the processor updates the initial filter coefficients when applying the adaptive filter to successive received acoustic waves.

22. An apparatus for providing filtered seismic signals, comprising:

a) a detector coupled to the earth for receiving an acoustic wave, the detector providing an output comprising a first signal and a second signal, the first signal and the second signal being indicative of directional components of the received acoustic wave;

b) a processor coupled to the detector for receiving the first signal and the second signal, said processor processing commands for applying an adaptive filter algorithm to the first signal, the adaptive filter including a feedback signal indicative of a selected portion of the first signal combined with the second signal, wherein the selected portion of the first signal is determined at least in part by applying a set of predetermined window parameters to an output of the adaptive filter algorithm, wherein the window parameters include offset dependent application windows based at least in part on phase differences between vertical and horizontal components of the acoustic wave.

* * * * *